United States Patent Office 3,325,401
Patented June 13, 1967

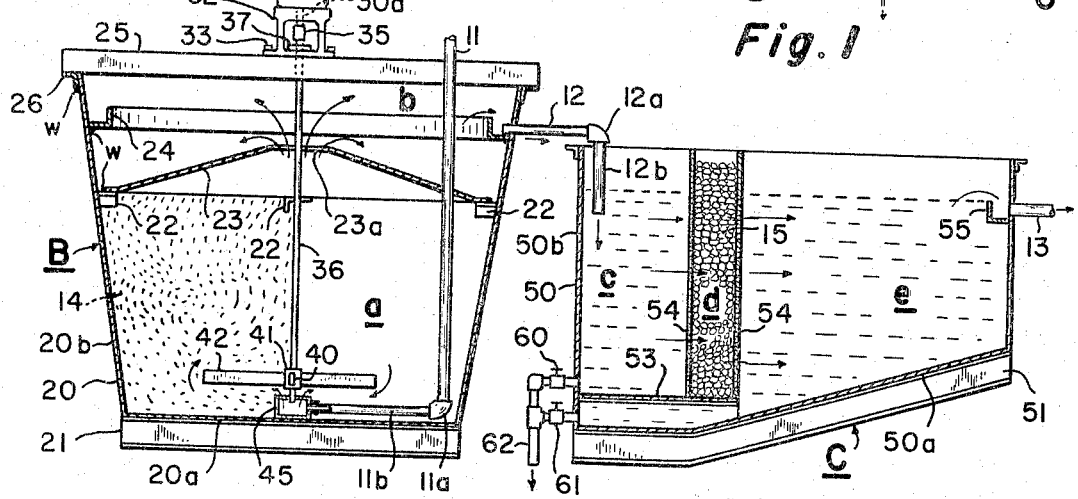
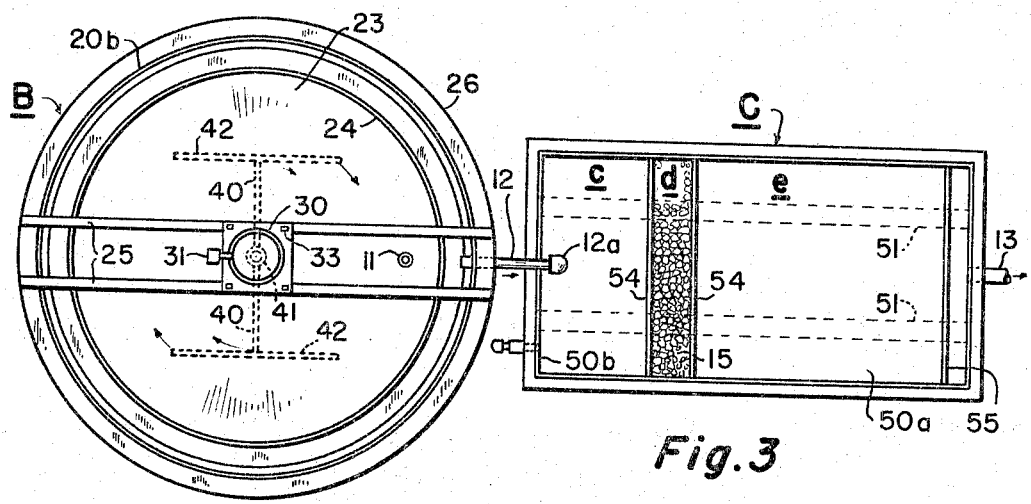
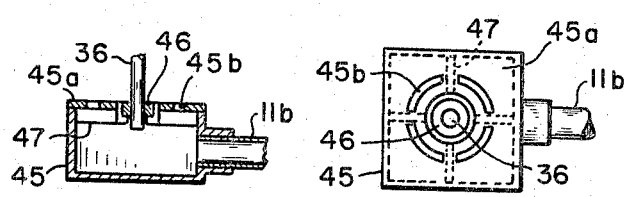

3,325,401
CONDITIONING ACIDIFIED COOLING WATERS
Leslie E. Lancy, Ellwood City, Pa., assignor to Lancy Laboratories, Inc., Zelienople, Pa., a corporation of Pennsylvania
Filed Nov. 5, 1965, Ser. No. 506,535
9 Claims. (Cl. 210—49)

This application is a continuation-in-part of my application Ser. No. 412,148 entitled, "Treatment of Spent Cooling Waters," and filed on Nov. 18, 1964, now U.S. Patent No. 3,294,680.

This invention pertains to the treatment of spent water and particularly, of water used for cooling purposes to make it innocuous or non-toxic before it is discharged into a sewer or natural body of water. More specifically, the invention relates to the treatment of waters containing soluble or dissolved toxic chromium compounds, such as chromic acid or chromates.

Cooling water as employed in various industrial processes is customarily recirculated throughout the system with heat imparted thereto being removed by a cooling tower or other suitable means. Chromic acid or chromate salts are introduced into the water as oxygen inhibitors, usually in a range of about 15 to 200 p.p.m., to form a so-called passive film on metal parts and protect them during the cooling operation. It will be apparent that the concentration of the chemical greatly increases during the use of the water due to the evaporation in the cooling operation, etc. Further, in order to maintain the effective action of the chromic acid or chromate salts in building-up and maintaining a thin oxide or passive film, it has been found necessary to add additional quantities from time to time along with new additions of fresh water as a blow-down. The blow-down water is used in order to maintain the dissolved salt below a scaling concentration. In such an operation, the chromic acid or the chromate salts are continuously consumed during the movement of the water through a cooling system, and chromic anhydride is reduced to a trivalent form which does not have the same inhibiting quality.

I have found that metal sulfides in the nature of calcium, zinc and iron sulfides can be successfully employed in providing an improved action in the conditioning of the waters before they are discharged as waste, as distinguished from ordinary sulfur compounds. Although metal sulfide solids, such as an iron pyrite, are for all practical purposes considered as insoluble compounds, I have found that they are highly useful for the reduction of chromic acid. As an insoluble compound, a metal sulfide cannot react ionically with the dissolved chromium and exchange electrons. Of the metal sulfides, I have found that iron sulfides, such as FeS and readily available iron pyrites $FeS_2$, although in theory not soluble (only about 4 to 5 mg./liter), can be effectively and highly efficiently utilized as well as other metal sulfides. The iron sulfides are particularly suitable since both the iron and sulfur ions will act as reducers.

Although the spent cooling waters in a systems are usually at a neutral to slightly alkaline pH, since welding and electric apparatus being cooled will be otherwise adversely affected, I have been able to directly utilize the spent waters in such a condition, on the basis of my discovery that the metal sulfides can be made continuously effective by, in effect, providing them in suitable hard particle or granular size and, in effect, scrubbing them during their utilization so as to maintain them fully active in carrying out the desired reactions. That is, I have determined that it is necessary to continuously remove a film which normally forms on the granules and which quickly builds-up to make the metal sulfides inactive or ineffective.

I have further found that the use of hard metal sulfides involves an economical type of operation, since they are only used-up proportionately to the requirements of the reaction with the dissolved chromium content of the waste solution. Utilizing an aqueous waste solution having a slightly alkaline pH (7.6 to 7.7) and passing such solution into a one liter container having fine mesh iron pyrites therein, I have been able to fully condition a cooling water waste solution containing 15 p.p.m. of hexavalent chromium as chromic acid. No chromic acid was found in the effluent when a flow rate through the container of about 174 ml. per hour up to a maximum of about 350 ml. per hour was maintained, and the iron pyrites were subjected to a continuous scrubbing action.

This has been an effective and highly efficient method of making spent cooling water innocuous for stream and sewer discharge. There are, however, cooling water applications where the flow rate of the spent cooling water is 100 gallons per minute or more and the chromic acid or chromate concentration is in the neighborhood of up to about 40 to 80 p.p.m. On the basis of the above type of treatment procedure, it would be necessary to scale the equipment by greatly enlarging the container. For example, for a flow rate of 100 g.p.m., where the concentration is 60 p.p.m. of chromic acid, a large size container of about 36,000 gallons would be required. A container of this size takes up considerable space, is expensive to provide and maintain and will require heavy equipment and high quantities of power for dispersing and agitating or, in other words, scrubbing the metal sulfides.

It has thus been an object of my invention to devise an improved conditioning procedure, system or means for treating spent cooling waters and particularly, waters from a system having a relatively high flow rate or a high concentration of dissolved toxic chromium content.

Another object of my invention has been to increase the effectiveness of a metal sulfide treatment of waste cooling waters to enable the continuous treatment of large quantities of the waters as well as relatively high toxic contents thereof in a relatively small treating bath, vessel or container.

A further object of my invention has been to increase the reaction effectiveness of and to maintain such reactive effectiveness of a metal sulfide in conditioning and making spent cooling waters non-toxic or innocuous.

A still further object of my invention has been to devise apparatus for facilitating the carrying out of my new and improved procedure.

These and other objects of my invention will appear to those skilled in the art from the description of the invention and the illustrated embodiments.

In the drawings, FIGURE 1 is a somewhat diagrammatic side view in elevation of a flow system employing by invention;

FIGURE 2 is a side sectional view in elevation through apparatus that may be employed for carrying out my invention;

FIGURE 3 is a top plan view on the scale of and of the apparatus of FIGURE 2;

FIGURE 4 is an enlarged fragmental section in elevation showing a detail of the apparatus of FIGURES 2 and 3; and FIGURE 5 is a top plan view on the scale of and of the apparatus detail shown in FIGURE 4.

I have now discovered that if the pH of the waste water to be treated is lowered to an acid range of about 2 to 3, the rate of reduction can be materially increased. It also appears that metal salts that are made insoluble by precipitation at the higher pH, tend to block some available pyrite and that this is obviated by lowering the pH to the acid range. That is, it appears that the operation can be materially speeded-up, so that a relatively small container (such as a one liter container) may be effectively utilized to eliminate the chromic acid or chromate salt content of the waste solution, by reason of the fact that the metal sulfides are found to be made increasingly effective and retained increasingly effective under conditions of a lower pH.

For the pH reduction, I use an inorganic acid, preferably hydrochloric acid. I have found that I can condition waste water flowing at the rate of one liter to 1200 ml./hour containing 50 p.p.m. of chromic acid ($CrO_3$) using a one liter container in which metal sulfide granules are agitated, without finding any chromic acid (dissolved toxic content) in the effluent coming from the container. This can be accomplished at flow rates below 1600 ml. per hour for a solution containing 50 and up to 80 p.p.m. of $CrO_3$, or for a solution containing 5 p.p.m. chromic acid in the effluent where the rate is maintained under 1800 ml. per hour, and where the aqueous solution to be treated is being continuously passed through a one liter container.

The metal sulfides in the container are importantly subjected to a shearing or scrubbing type of action during the treatment to continuously maintain their surfaces free of deactivating films that would otherwise tend to build-up and block the reactions. The size of the granules or particles of the metal sulfides should be such that they will have, as a minimum, not less than a 200 mesh screening size and, on the other hand, will be below about a one-half inch maximum size. Below about a 200 mesh size, the particles tend to flow out with the water flowing through the system and over the maximum size and above about one-half an inch size, they tend to have a smaller surface area for their weight which tends to inhibit their motion in the water solution. An optimum size of the granules is about 25 to 50 mesh.

As previously indicated, the metal sulfides, such as iron pyrites, are, in themselves, insoluble in the solution and are only consumed at the rate the chromic acid or chromate salts enter the container or treatment chamber. The conversion is effected of insoluble sulfides into soluble metal salts and the sulfur ions will go from insoluble sulfide iron to insoluble sulfur. The chromic acid or chromate salts will go from the hexavalent and soluble forms to trivalent chromate. The reaction accomplished is represented by the folowing equation:

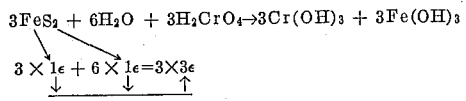

If the treated solution is then subjected to an alkali, the soluble metal salts are converted into insoluble metal hydroxides and the trivalent chromate into an insoluble hydroxide. Precipitated iron and precipitated chromic acid tend to remove hydroxide and to thus slightly reduce the pH of the solution.

The alkaline treatment may be accomplished in a separate retention bath, basin, vessel, container or settling tank wherein complete precipitation is effected and precipitated iron and non-toxic precipitated trivalent chromium salts are collected as sludge. However, even if some of these insoluble compounds are carried out from the settling tank, living organisms cannot be adversely affected by reason of their insoluble nature.

It will be noted that the neutralization and settling of the precipitated metal hydroxides may not be needed in every installation. That is, trivalent chromium is not nearly as toxic as hexavalent chromium, principally because it tends to become neutralized in reaction with the ground or in entering a natural body of water so as to precipitate out and form an inert chromic hydroxide that is not absorbed by biological organisms. Iron is not a toxic compound and will precipitate at a pH of about 3.5 or higher which would be the result when it is introduced into a natural body of water.

The importance of the present invention is that it can make use of a small reaction vessel while still making possible an automatic waste treatment and an economical operation in which the metal sulfides are consumed only at the rate and concentration at which the chromic acid enters the system. The neutralization can be accomplished by feeding in alkaline at a preset rate or by means of an automatic pH controlling means or preferably, as shown in the drawings, by passing the effluent from a reaction bath, container or vessel through a mass of magnesium oxide in a second bath, container or vessel. Magnesium oxide acts as a neutralizer to form magnesium hydroxide in water when it is on the acidic side. Using such a container for neutralization and settling, sludges can be periodically removed to a suitable collective system or basin. In the illustrated apparatus shown in the drawings, with particular reference to FIGURE 1, cooling waste water is introduced through pipe 10 into a vessel or container at station A to which an inorganic acid is added so as to lower the pH to a count of about 3 or lower. The now-acidic waste water then passes from the station A through pipe 11 into a reaction vessel or container at station B where it is reacted with, for example, iron pyrite granules as they are agitated. The effluent or solution containing the reacted materials is then passed through pipe 12 into a neutralizing and settling container or vessel at station C. At station C, hydroxide precipitates are formed and collected as sludge. The fully treated water or effluent is then passed from station C through pipe 13 into a sewage system or natural body of water. Instead of a vessel or container at station A, the inorganic acid may be fed automatically to a connection between the pipes 10 and 11 so as to lower the pH to the acidic range.

In FIGURES 2 and 3, I have illustrated apparatus which may be used at stations B and C. As shown, an upwardly-diverging or substantially cone-shaped container or vessel 20 is provided at station B and may be supported along its bottom wall 20a on suitable spaced-apart beam or channel members 21. Bottom and side walls 20a and 20b of the container 20, along with a top closure wall or cover member 23 define an agitation and reaction chamber a within which metal sulfide granules 14 such as pyrites are positioned. In FIGURE 2, the granules 14, although shown, for simplicity of illustration, on only one side of the chamber a, actually fill it. An annular angle piece or member 22 is secured, as by weld metal w, within the inner side of the wall 20b, adjacent its upper end portion, to receive and support outer peripheral edges of the cover or top closure member 23. The cover member 23 may, as shown, be of somewhat conical shape so as to project centrally-upwardly and define a central port or open portion 23a therein through which treated effluent passes into an upper outflow-collecting or take-off chamber b from the reaction chamber a, as indicated by the arrows of FIGURE 2. An overflow trough 24, defined by an annular angle member is secured intermediate the depth of the upper chamber b to the side wall 20b for collecting the treated or reacted effluent, so that it may be taken off through the outlet pipe 12.

A pair of cross-extending transversely spaced-apart beam members 25 are secured centrally to rest on an annular mounting flange 26 at the upper edge of the container 20. The members 25 and the flange 26 may be secured in place, as by weld metal w. The cross-extending members 25 serve as a platform support for an agitator motor 30 which may be of any suitable type, such as an electric motor, driven either by A.C. or D.C.

As shown particularly in FIGURE 2, the motor 30 has a control switch 31 and is secured in an endwise-mounted relation on the members 25 by a frame structure 32 and headed bolts 33. Motor shaft 30a is shown coupled to a vertical propeller or agitator shaft 36 by a sleeve coupling 35. The shaft 36 has a thrust washer 37 that bears on a bottom part of the frame 32 through which the shaft extends. The shaft 32 also extends downwardly along the upper take-off chamber b, centrally-downwardly along the reaction chamber a and, adjacent its lower end, is provided with a mounting sleeve 41 from which a pair of oppositely-extending arms 40 project, see also FIGURE 3. Each arm 40, at its end, carries a blade or a blade assembly 42 that is centrally-secured thereon for movement therewith under the activation or rotation of the shaft 36. The blades 42 as well as the arms 40 serve to continuously agitate the metal sulfide particles within the reaction chamber a, so as to scrub them and fully circulate the water being treated therethrough before it passes centrally up through the port or open portion 23a in the top closure member 23.

The waste water to be treated is introduced vertically downwardly along the pipe 11, elbow connection 11a, and a horizontal bottom pipe 11b, into a distribution chest or box 45. As shown particularly in FIGURES 4 and 5, cross-extending rib support members 47 are secured on the top portion of the chest or box 45 and at their inner ends, support a bearing 46 through which the lower end of the agitator shaft 36 extends. The box or chest 45 has a top closure 45a which is shown cut-out in the form of quadrants to define a series of curvilinear passages, slots or ports 45b in a spaced relation about the bearing 46. As shown particularly in FIGURE 2, the waste water flows upwardly through the ports 45b underneath the arms 40 and blades 42, and then progressively upwardly within the reaction chamber a. It is reacted during such upward movement to convert its soluble toxic chromium content into a substantially non-toxic content.

The thus-treated solution is taken-off from station B through out-flow pipe 12, an elbow connection 12a, and is introduced into a container, tank or vessel 50 at station C by a down-flow vertical pipe 12b below the level of the liquid therein. It will be noted that the container 50 is shown open at its top; it is defined by a bottom wall 50a and vertical side walls 50b. The bottom wall 50a serves to collect sludge and, in this connection, is sloped towards one end of the container 50.

The container 50 is divided into a collecting chamber c, a neutralization chamber d and a settling chamber e by a pair of spaced-apart, vertical, perforated partition wall members 54 and by a supplemental or secondary bottom wall 53 of the chamber c. It will be noted that a sludge collecting space is defined between the portions of the main bottom wall 50a and the supplemental bottom wall 53, and that the supplemental bottom wall serves as bottom support for a column of alkali 15 within the chamber d and as a sludge collector for the chamber c. A suitable alkali, such as magnesium oxide in the form of a column of lumps (synthetic magnesite), designated as 15, is shown as filling the chamber d between the perforated members 54, so that the solution has to flow therethrough from the chamber c into the chamber e. A cross-extending angle piece 55 is secured at one end of the chamber e to the inner portion of the side wall 50b to serve as a trough for collecting the fully conditioned solution or water adjacent the top of the container 50. The treated solution or aqueous affluent is then removed from the overflow level of the chamber e by means of the trough 50 and an outflow pipe 13, and may then be introduced directly into a sewage system or into a stream. Sludge may be periodically removed from the bottom of the chambers c and e through valves 60 and 61 and discharge connection 62 to a suitable collecting bed.

It will be apparent that, in accordance with the disclosure, dependence is placed upon the direct reaction of the surfaces of the hard metal sulfide granules with the hexavalent toxic chromium solution content of the spent cooling water, as distinguished from a reaction with a soluble metal sulfide content imparted to the solution. It is well known that zinc and iron sulfides are insoluble in water and that calcium sulfide has only a slight solubility in water. By using sulfides of this nature and particularly, the optimum sulfide of iron, I have been able to inhibit the forming of a soluble sulfide in the spent cooling water from the sulfide granules, even though the spent water is acidified within a maximum of about 2 pH and, in effect, provide a self-regulating procedure wherein the metal sulfide granules are essentially only consumed by their reaction with the hexavalent chromium solution content of the water. In addition to making it possible to progressively and continuously in line, quickly and fully convert the solution hexavalent chromium content into insoluble trivalent chromium, as the requirements for such reaction exist, the reaction is maintained self-regulating and the solution is prevented from becoming toxic by, in effect, inhibiting the formation of a soluble metal sulfide. Thus, the discharged water is not polluted or made toxic from the standpoint of soluble metal salts. With reference to FIGURES 1 and 2 of the drawings, the water treated to convert its hexavalent chromium compounds or content is shown as introduced in the continuous line into the collecting chamber c of another vessel C, and moved horizontally or transversely through the column of alkali mganesite lumps d into a settling chamber e. The precipitated-out metal content is then collected in the vessel C and moved along the inclined plane represented by the bottom wall 50a towards one end of the vessel for removal and disposal; see the pipe 62. The alkali treatment is also self-regulating.

Although for the purpose of illustration, I have shown suitable apparatus for carrying out my invention, it will be apparent to those skilled in the art that various modifications as well as other arrangements may be employed in accordance with the concept of my invention and in accordance with the novel procedure thereof.

What I claim is:

1. A self-regulating continuous line method of fully and more quickly converting soluble toxic hexavalent chromium compounds into trivalent chromium in spent contaminated cooling water containing contaminants of the class consisting of chromic acid and chromates for making the water innocuous which comprises, providing within a vessel a loose mass of substantially water-insoluble solid metal sulfide particles of a size that will at least pass through a 200 mesh screen and up to about 2½ inches in diameter, providing the contaminated water with an acid pH within a maximum of about 2 and passing the acid pH contaminated water through the loose mass of particles in contact with surface portions thereof, surface-reacting the particles with the hexavalent chromium compounds while agitating the particles and scrubbing their surfaces against each other, while inhibiting the forming of soluble metal sulfides from the particles, continuing to pass the acid pH contaminated water through the loose mass of the particles during the agitation and scrubbing, while surface-reacting the particles with the hexavalent chromium content of the water and fully converting the hexavalent content into trivalent chromium at substantially the rate of continuous movement of the water through the mass of the particles, and continuously removing treated water from the vessel.

2. A method as defined in claim 1 wherein the contaminated water is first moved through a vessel containing acid to impart the acid pH thereto before it is introduced into the vessel containing the mass of particles.

3. A method as defined in claim 1 wherein the acid pH of the contaminated water is effected by adding hydrochloric acid thereto.

4. A method as defined in claim 1 wherein, the particles are of the class consisting of iron sulfides such as FeS and iron pyrites, and both the metal and sulfur contents of the particles are surface-reacted with the hexavalent chromium content of the water to fully convert it into trivalent chromium.

5. A method as defined in claim 1 wherein reaction products carried by the treated water that is being continuously removed from the vessel are reacted with an alkali at a sufficient pH to precipitate out its metal content in the form of hydroxides.

6. A method as defined in claim 1 wherein a column of magnesite lumps is provided in a second vessel, the treated water being continuously removed from the first-mentioned vessel is continuously passed into the second vessel and through the column of magnesite lumps, the treated water in passing through the magnesite lumps is reacted therewith in a self-regulating manner to precipitate out its metal content in the form of metal hydroxides, and the precipitated out metal content is collected in the form of sludge within the second vessel.

7. A method as defined in claim 6 wherein, the treated water is moved transversely in the second vessel from a collecting chamber through the column of magnesite lumps into a settling chamber, and the precipitated out metal content is collected in the form of sludge along a bottom portion of the second vessel.

8. A method as defined in claim 7 wherein the sludge collected along the bottom portion of the second vessel is moved on an inclined plane therealong towards one end thereof for disposal.

9. A method as defined in claim 7 wherein the acid pH of the contaminated water is imparted thereto by adding hydrochloric acid, and the solid metal sulfide particles are of the class consisting of iron sulfides such as FeS and iron pyrites.

References Cited
UNITED STATES PATENTS

| | | | |
|---|---|---|---|
| 1,932,531 | 10/1933 | Parker | 23—285 |
| 2,110,187 | 3/1938 | Williams | 23—56 |
| 2,977,202 | 3/1961 | Bueltman et al. | 23—285 |
| 3,027,321 | 3/1962 | Selm et al. | 210—59 |
| 3,218,252 | 11/1965 | Glover et al. | 210—4 |

OTHER REFERENCES

Hoover, C. R. et al., Disposal of Waste Liquors From Chromium Plating, Ind. Eng. Chem., vol. 33, No. 1, January, 1941, pp. 131–134.

Hodges, M. E., Treatment of Chromium and Other Plating Room Waste Waters, Metal Finishing, vol. 51, October 1953, pp. 60–64.

Gurnham, C. F., Principles of Industrial Waste Treatment, 1955, John Wiley and Sons, New York, pp. 177–182, 220, 221 and 233.

MORRIS O. WOLK, *Primary Examiner.*

MICHAEL E. ROGERS, *Examiner.*